(12) United States Patent
Kawasaki et al.

(10) Patent No.: US 10,432,070 B2
(45) Date of Patent: Oct. 1, 2019

(54) ROTATING ELECTRIC MACHINE, ELEVATOR HOIST, AND METHOD FOR MAGNETIZING AND DEMAGNETIZING PERMANENT MAGNET OF ROTATING ELECTRIC MACHINE

(71) Applicant: Mitsubishi Electric Corporation, Chiyoda-ku, Tokyo (JP)

(72) Inventors: Sachiko Kawasaki, Tokyo (JP); Hironori Tsuiki, Tokyo (JP); Akira Hashimoto, Tokyo (JP); Takashi Umeda, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 253 days.

(21) Appl. No.: 15/547,966

(22) PCT Filed: Jan. 18, 2016

(86) PCT No.: PCT/JP2016/051288
§ 371 (c)(1),
(2) Date: Aug. 1, 2017

(87) PCT Pub. No.: WO2016/129330
PCT Pub. Date: Aug. 18, 2016

(65) Prior Publication Data
US 2018/0026502 A1 Jan. 25, 2018

(30) Foreign Application Priority Data
Feb. 10, 2015 (JP) ................. 2015-023803

(51) Int. Cl.
*H02K 15/03* (2006.01)
*H02K 3/28* (2006.01)
(Continued)

(52) U.S. Cl.
CPC ............ *H02K 15/03* (2013.01); *B66B 11/043* (2013.01); *H02K 3/28* (2013.01); *H02K 5/1732* (2013.01);
(Continued)

(58) Field of Classification Search
CPC .. H02K 3/00; H02K 3/28; H02K 3/49; H02K 3/493; H02K 15/00; H02K 15/03; H02K 21/00; H02K 21/16; H02K 21/22; H02P 9/08; H02P 9/30
USPC ........................................ 310/180, 184, 185
See application file for complete search history.

(56) References Cited

U.S. PATENT DOCUMENTS 6,441,521 B1 * 8/2002 Dombrovski ........ H02K 21/042
310/156.01
2005/0253474 A1 11/2005 Yanashima et al.
2012/0169163 A1 7/2012 Imai et al.

FOREIGN PATENT DOCUMENTS

JP 2002-300762 A 10/2002
JP 2009-183127 A 8/2009
(Continued)

OTHER PUBLICATIONS

International Search Report (PCT/ISA/210) dated Apr. 19, 2016, by the Japanese Patent Office as the International Searching Authority for International Application No. PCT/JP2016/051288.
(Continued)

*Primary Examiner* — Tran N Nguyen
(74) *Attorney, Agent, or Firm* — Buchanan Ingersoll & Rooney PC

(57) ABSTRACT

A rotating electric machine includes: a stator having an armature core having slots formed between magnetic pole teeth, and a plurality of coils each of which is wound so as to straddle a plurality of the magnetic pole teeth; and a rotor including a plurality of permanent magnets disposed at certain intervals on an outer peripheral surface of the magnetic yoke, and the coils include an armature coil for driving the rotating electric machine and a non-armature coil for magnetizing or demagnetizing the permanent magnets of the rotor.

20 Claims, 7 Drawing Sheets

(51) Int. Cl.
  *B66B 11/04* (2006.01)
  *H02K 5/173* (2006.01)
  *H02K 21/14* (2006.01)
  *H02K 11/225* (2016.01)
  *H02K 1/16* (2006.01)
  *H02K 3/493* (2006.01)

(52) U.S. Cl.
  CPC .......... *H02K 21/14* (2013.01); *H02K 21/145* (2013.01); *H02K 1/16* (2013.01); *H02K 3/493* (2013.01); *H02K 11/225* (2016.01)

(56) References Cited

FOREIGN PATENT DOCUMENTS

| | | |
|---|---|---|
| JP | 2011-188637 A | 9/2011 |
| JP | 4862292 B2 | 1/2012 |
| JP | 2012-143088 A | 7/2012 |
| JP | 2014-003845 A | 1/2014 |

OTHER PUBLICATIONS

Written Opinion (PCT/ISA/237) dated Apr. 19, 2016, by the Japanese Patent Office as the International Searching Authority for International Application No. PCT/JP2016/051288.

Office Action (Notification of Reason for Refusal) dated Jan. 8, 2019, by the Korean Patent Office in corresponding Korean Patent Application No. 10-2017-7017908 and English translation of the Office Action. (7 pages).

Office Action dated Oct. 9, 2018, by the Chinese Patent Office in corresponding Chinese Patent Application No. 201680009415.2 and English translation of the Office Action. (14 pages).

\* cited by examiner

ROTATING ELECTRIC MACHINE, ELEVATOR HOIST, AND METHOD FOR MAGNETIZING AND DEMAGNETIZING PERMANENT MAGNET OF ROTATING ELECTRIC MACHINE

TECHNICAL FIELD

The present invention relates to a rotating electric machine including an armature that is a stator and a rotor that rotates relative to the armature and has a permanent magnet type field magnet, an elevator hoisting machine, and a method for magnetizing and demagnetizing permanent magnets of the rotating electric machine.

BACKGROUND ART

An elevator is continuously used for a long term of 20 years or more. If a failure such as a coil insulation failure or breakage of a magnet occurs in a rotating electric machine during use of the elevator, it is necessary to disassemble and repair the rotating electric machine.

An elevator hoisting machine is disclosed which includes a stator core that is vertically divided into two portions on a shaft center and a stator housing that also serves as a bearing stand, holds the stator core, and is vertically divided into an upper stator housing and a lower stator housing on the shaft center so that a stator maintenance space is reduced and so that dividing and reassembling operation becomes easy (see, for example, Patent Document 1). Furthermore, a method for manufacturing a motor in which a permanent magnet embedded in a rotor is magnetized by using an electric current passed through a stator coil (see, for example, Patent Document 2).

CITATION LIST

Patent Document

Patent Document 1: Japanese Patent No. 4862292 (Paragraphs [0009] and [0011] and FIGS. 3 and 4)
Patent Document 2: Japanese Laid-Open Patent Publication No. 2002-300762 (Paragraphs [0018] and [0039] and FIG. 1)

SUMMARY OF THE INVENTION

Problems to be Solved by the Invention

However, according to the invention disclosed in Patent Document 1, it is necessary to provide a guide device to a stator and a rotor in order to prevent the stator and the rotor from making contact with each other due to the attraction force of a permanent magnet in the dividing operation. Furthermore, it is difficult to divide and reassemble the elevator hoisting machine due to the attraction force of the permanent magnet. One solution to this problem is the invention disclosed in Patent Document 2. However, according to the invention disclosed in Patent Document 2, an electric current of approximately several to several tens of kA is needed to magnetize the permanent magnet. This may possibly apply strong force to the coil in the magnetizing step and break the coil itself due to contact of an insulation coating with a core, thereby leading to a risk of markedly shortening the lifetime of the product.

The present invention has been made to solve the above problem, and an object of the present invention is to provide a rotating electric machine that can be disassembled and assembled with good workability and has good operating characteristics, an elevator hoisting machine, and a method for magnetizing and demagnetizing a permanent magnet of a rotating electric machine.

Solution to the Problems

A rotating electric machine according to the present invention includes: a stator including an armature core including a back yoke having an annular shape, plurality of magnetic pole teeth extending radially inward from the back yoke, and slots surrounded by the back yoke and the magnetic pole teeth, and a plurality of coils each of which is wound so as to straddle a plurality of the magnetic pole teeth and is disposed in the slots; and a rotor including a rotary shaft, a magnetic yoke provided on an outer peripheral side of the rotary shaft, and a plurality of permanent magnets disposed at certain intervals on an outer peripheral surface of the magnetic yoke, wherein the coils include armature coils for driving the rotating electric machine and a non-armature coil for magnetizing or demagnetizing the permanent magnets of the rotor.

An elevator hoisting machine according to the present invention includes: the rotating electric machine that is used as a motor for hoisting machine; a first power source for the armature coils; and a second power source for the non-armature coil.

A method for magnetizing or demagnetizing permanent magnets of the rotating electric machine includes the steps of: passing a magnetizing or demagnetizing electric current through the non-armature coil; and rotating the rotor by a predetermined angle, the step of passing the magnetizing or demagnetizing electric current and the step of rotating the rotor being repeated.

Effect of the Invention

In the rotating electric machine according to the present invention, since the group of coils includes armature coils for driving the rotating electric machine and a non-armature coil for magnetizing or demagnetizing the permanent magnets of the rotor, it is possible to markedly lower the attraction force of the permanent magnets by lowering the magnetic force of the permanent magnets before disassembling or assembling. It is therefore possible to perform disassembling and assembling operation with good workability and to achieve good operating characteristics.

In the elevator hoisting machine according to the present invention, since the aforementioned rotating electric machine is used, it is possible to magnetize or demagnetize the permanent magnets of the rotating electric machine by using the non-armature coil. It is therefore possible to improve work efficiency during installation and inspection.

In the method for magnetizing or demagnetizing the permanent magnets of the rotating electric machine according to the present invention, since the step of passing the magnetizing or demagnetizing electric current through the non-armature coil and the step of rotating the rotor by the predetermined angle are repeated, it is possible to improve work efficiency during installation and inspection of the rotating electric machine.

DESCRIPTION OF EMBODIMENTS

Embodiment 1

Figure 1:
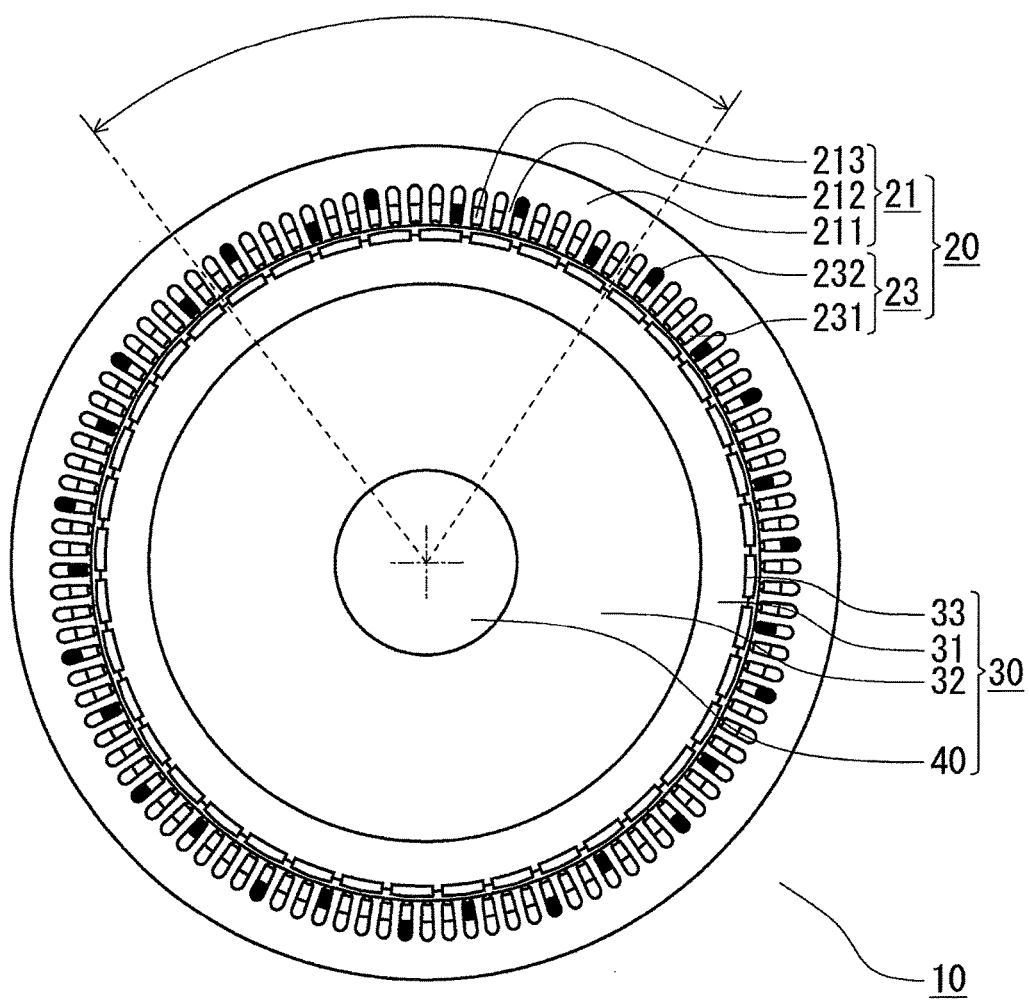
FIG. 1 is a configuration diagram according to a rotating electric machine of Embodiment 1 of the present invention.

Embodiment 1 relates to a rotating electric machine that includes: a stator divided into a plurality of blocks including an armature core having slots formed between magnetic pole teeth, and a plurality of coils each of which is wound so as to straddle a plurality of the magnetic pole teeth; and a rotor including a plurality of permanent magnets that are disposed at certain intervals on an outer peripheral surface of a magnetic yoke provided on an outer peripheral side of a rotary shaft. The coils include an armature coil for driving the rotating electric machine and a non-armature coil for magnetizing or demagnetizing the permanent magnets of the rotor.

The structure and operation of the rotating electric machine according to Embodiment 1 of the present invention will be described below with reference to FIG. 1, which is a configuration diagram of the rotating electric machine, FIG. 2, which is a configuration diagram of coils, FIG. 3, which is a coil arrangement expansion diagram, FIG. 4, which is a comparison diagram compared with the coil arrangement expansion diagram, FIG. 5, which is a diagram for explaining division of a stator, and FIG. 6, which is a diagram for explaining a magnetic path created by non-armature coils.

First, the overall configuration of a rotating electric machine 10 according to Embodiment 1 of the present invention will be described with reference to FIGS. 1 and 2. FIG. 1 illustrates a cross section that is orthogonal to the axial direction of the rotating electric machine 10.

The rotating electric machine 10 includes a stator 20 that has a cylindrical shape and a rotor 30 that is disposed within the stator 20 and rotates therein. The stator 20 has a function as an armature, and the rotor 30 has a function as a field magnet.

Although both the armature and the field magnet are components that generate a magnetic field for obtaining torque, a component that generates a constant magnetic field is called a field magnet and a component that generates a magnetic field that is variable depending on the magnitude or the frequency of an inputted electric current, or the like is called an armature.

The rotor 30 is made of a magnetic steel sheet or a magnetic material such as cast iron and includes a rotary shaft 40, a magnetic yoke 31 that forms a magnetic path, a rotor support member 32 interposed between the rotary shaft 40 and the magnetic yoke 31, and a plurality of permanent magnets 33 provided on the outer peripheral surface of the magnetic yoke 31.

The permanent magnets 33 are disposed at certain intervals in the circumferential direction of the magnetic yoke 31 and form a plurality of magnetic poles. In this example, 40 permanent magnets 33 are provided, and the number of magnetic poles P is 40 accordingly. The permanent magnets 33 are desirably disposed at regular intervals in the circumferential direction of the magnetic yoke 31.

The stator 20 is made of, for example, a magnetic steel sheet and includes an armature core 21 that forms a magnetic path, an insulating member (not illustrated), and a group of coils 23.

The armature core 21 includes a back yoke 211 having an annular shape, a plurality of magnetic pole teeth 212 that extend radially inward from the back yoke 211, and slots 213 that are regions surrounded by the back yoke 211 and the magnetic pole teeth 212. The number of the magnetic pole teeth 212 is the same as the number of the slots 213. In this example, each of the number of magnetic pole teeth and the number of slots Q is 105.

The insulating member is provided so as to surround inner peripheries of the slots in order to prevent electric short circuit between the armature core 21 and the group of coils 23. Since the group of coils 23 has a plurality of phases as described later, phase-to-phase insulation paper that insulates the phases from one another, a wedge that prevents the coils from coming out the slots, varnish in which the group of coils is immersed, and the like are also included in this insulating member (each of these members is not illustrated).

The group of coils 23 is functionally divided into two kinds of coils, i.e., armature coils 231 that generate a magnetic field for obtaining torque of the rotating electric machine 10 and non-armature coils 232 other than the armature coils 231.

The armature coils 231 are divided into a plurality of phases in order to smoothly drive the rotating electric machine 10. In this example, the armature coils 231 are divided into three phases: a U phase, a V phase, and a W phase.

A plurality of coils 230 constitute each phase of armature coils 231, and the number of coils in each phase is the same as that in another phase. Each of the coils 230 has two coil sides 241, two coil ends 242 that connect the coil sides 241 at the upper and lower ends of the armature core 21, and coil terminals 243 to be joined to other coils 230, as illustrated in FIG. 2. The two coil sides 241 are provided so as to straddle a plurality of the magnetic pole teeth 212 and are disposed in different slots 213, respectively.

Each of the coils 230 is composed of, for example, a wire in which an insulating layer is provided on the surface of copper, aluminum, or the like and which has a wire diameter of approximately $\phi 0.2$ to $\phi 1.0$ (a size that fits in the slots 213) and is wound several to several tens of turns. Each turn may be constituted by a plurality of thin wires so that the coils 230 are more easily inserted into the slots 213.

The armature coils 231 are configured such that the respective coils 230 are connected in series or in parallel, and one terminal of each coil is connected to a control circuit or to both the control circuit and a coil terminal of another phase, and the other terminal of each coil is connected to a coil terminal of another phase or to both the control circuit and a coil terminal of another phase.

In the case where one terminal is connected to the control circuit and the other terminal is connected to a coil terminal of another phase, such a circuit is called a star circuit. Meanwhile, in the case where one terminal is connected to both the control circuit and a coil terminal of another phase and the other terminal is connected to both the control circuit and a coil terminal of another phase, such a circuit is called a delta circuit.

Coils 230 used as the non-armature coils 232 also have the same configuration as that described above.

One or more non-armature coils 232 are provided, and the non-armature coils 232 have no phase. In the case where the non-armature coils 232 are a plurality of coils 230, it is desirable that each of the coils be wound in a reverse direction to an adjacent coil and that the coils be connected in series.

Next, the positional relationship between the armature coils 231 and the non-armature coils 232 will be described with reference to the expansion diagram.

Figure 3:
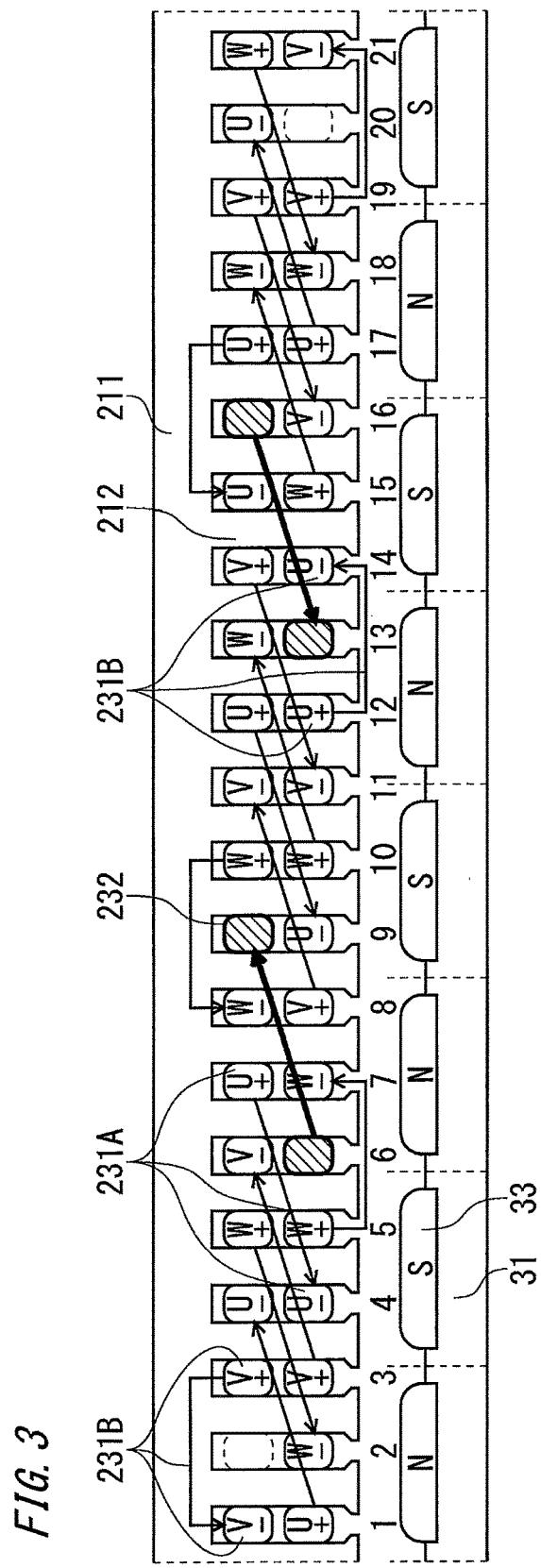
FIG. 3 is a coil arrangement expansion diagram according to the rotating electric machine of Embodiment 1 of the present invention.

FIG. 3 is an expansion diagram illustrating part of the rotating electric machine 10 according to Embodiment 1 of the present invention. FIG. 4 illustrates an example in which no non-armature coil 232 is provided and the armature coils 231 are disposed in all of the slots in an optimum manner without changing the configuration of the armature core 21. FIG. 4 is used as a comparison diagram for describing arrangement of the group of coils.

In the example of Embodiment 1, the number of magnetic poles P is 40, and the number of slots Q is 105. FIGS. 3 and 4 illustrate part (referred to as a block 1) of 72° obtained by dividing the rotating electric machine 10 by 5, which is the greatest common divisor of P and Q. This corresponds to an angle (X=72°) for one block in FIG. 1.

Figure 4:
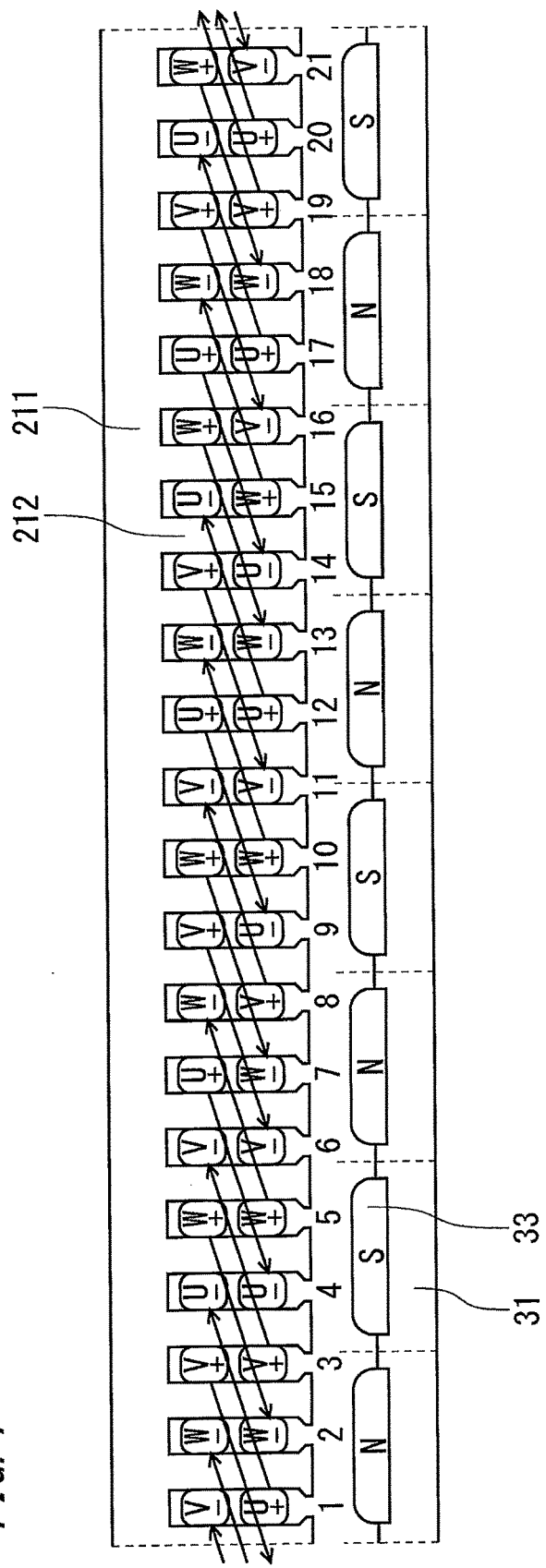
FIG. 4 is a comparison diagram compared with the coil arrangement expansion diagram according to the rotating electric machine of Embodiment 1 of the present invention.

Numerals on the outer sides of the slots in the schematic diagrams of FIGS. 3 and 4 are slot numbers assuming that the leftmost slot in FIGS. 3 and 4 has a slot number 1. U, V, and W in FIGS. 3 and 4 are characters representative of phases of the coils. The symbols added to the phases represent directions in which electric current flows through the coils. Specifically, + indicates that an electric current flows upward on the paper, and − indicates that an electric current flows downward on the paper. The lines that connect the slots so as to straddle the magnetic pole teeth in FIGS. 3 and 4 indicate a way in which coil ends are connected and a direction of flow of an electric current.

It is desirable that the coils of the three phases be arranged in a periodical pattern in the circumferential direction in order to achieve well-balanced driving of the rotating electric machine 10. In the example of Embodiment 1, the coils are arranged periodically in a cycle of angles (72° in this example) obtained by dividing the rotating electric machine 10 by 5, which is the greatest common divisor of P and Q.

Furthermore, it is desirable that a synthetic vector of a magnetomotive force or an inductive voltage created by the armature coils of each phase be the same as that created by the armature coils of another phase so that a phase difference is equally divided into an electric angle of 120°.

In FIG. 3, the armature coils 231 include two kinds of coils 230 (a first armature coil and a second armature coil).

The first armature coil 231A has coil sides on an upper side (opening side) and a lower side (core back side) of slots. The number of the magnetic pole teeth 212 which the first armature coil 231A straddles is a minimum natural number exceeding (the number of slots/the number of magnetic poles) (3 because 105/40=2.625 in the case of FIG. 3).

The second armature coil 231B has coil sides on upper sides or lower sides of slots. The number of the magnetic pole teeth 212 which the second armature coil 231B straddles is a maximum natural number that does not exceed (the number of slots/the number of magnetic poles) (2 in the case of FIG. 3).

Procedures for disposing the second armature coil 231B will be described below with reference to FIG. 4 in which the armature coils 231 are disposed in all of the slots in an optimum manner.

[Procedure 1] Attention is paid to the leftmost and rightmost coils in one block of FIG. 4. Such coils are the slot number 1 and the slot number 21 in this example.

[Procedure 2] Attention is paid to coils: the coils are disposed in slots within the range of a natural number (2) that is below (the number of slots/the number of magnetic poles) from the slot numbers 1 and 21; they are located in the same positions (upper side or lower side) in the slots; and they have the same phases, and in which an electric current flows in a reverse direction. Such coils are V+ of the slot number 3 in the case of V− of the slot number 1 and V+ of the slot number 19 in the case of V− of the slot number 21.

[Procedure 3] Since electromagnetic action does not change even if coil sides found in the procedure 2 are connected, the coil sides are reconnected. Second armature coils are created by using the slot numbers 1 and 3 and using the slot numbers 19 and 21.

[Procedure 4] Coils in the other phases that are in the same relationship as the second armature coils created in the procedure 3 are also found and are configured in the same way. In the example of Embodiment 1, the number of the slots is 21, and the number of the phases is 3. Accordingly, this relationship appears every 7 teeth. Taking note of this, second armature coils are further created by using the slot numbers 8 and 10, the slot numbers 15 and 17, the slot numbers 5 and 7, and the slot numbers 12 and 14.

The armature coils 231 of each phase include the same number of first armature coils and the same number of second armature coils as the armature coils 231 of another phase. In FIG. 3, among six coils per phase, four coils are first armature coils, and two coils are second armature coils determined in the procedures 1 through 4 described above. This makes it possible to achieve uniform coil resistance in the phases, thereby reducing variations in electric current passing through the coils during driving.

In the above description, the case where the number of the slots is 105 and the number of the poles is 40 has been described. However, other combinations are also possible. For example, the aforementioned combination of first armature coils and second armature coils is found in the case where the value of (the number of slots/the number of magnetic poles) is larger than the value obtained by subtracting 1 from the number of the phases and is smaller than the number of the phases, for example, in the case with where 108 slots and 42 poles.

Furthermore, in Embodiment 1, attention is paid to coils that are not connected in one block (obtained by dividing the stator by the greatest common divisor of the number of slots Q and the number of magnetic poles P) among the coils other than the second armature coils in FIG. 4. On the left side of FIG. 4, such a coil is W− on the lower side of the slot number 2 sandwiched between V− of the slot number 1 and V+ of the slot number 3 that constitute a second armature coil.

On the right side of FIG. 4, such a slot is U+ on the upper side of the slot number 20 sandwiched between V+ of the slot number 19 and V− of the slot number 21.

Being not connected in one block means that removing such coils from the group of coils completes the coil arrangement per block. Accordingly, a divided structure of the stator is achieved even in the case of distributed winding.

However, in order to obtain a rotating electric machine having a divided structure by removing such coils from the group of coils, it is necessary to remove coils at similar positions in one block from the group of coils so that balance among the coils of the three phases is achieved. The positions of the removed coils are positions obtained by equally dividing 21 slots as in the procedure 4 for disposing the second armature coils. That is, it is only necessary to remove a coil every 7 teeth.

Specifically, in FIG. 4, such coils are V+ on the lower side of the slot number 9, W+ on the lower side of the slot number 16, W− on the upper side of the slot number 13, and V− on the upper side of the slot number 6.

In this way, the group of coils fits within one block without breaking the balance among the three phases. That is, the coil arrangement is complete within the block, and coils are not connected between blocks.

The divided structure of the rotating electric machine 10 in the case where the group of coils fits within one block will be described below with reference to FIG. 5.

Figure 2:
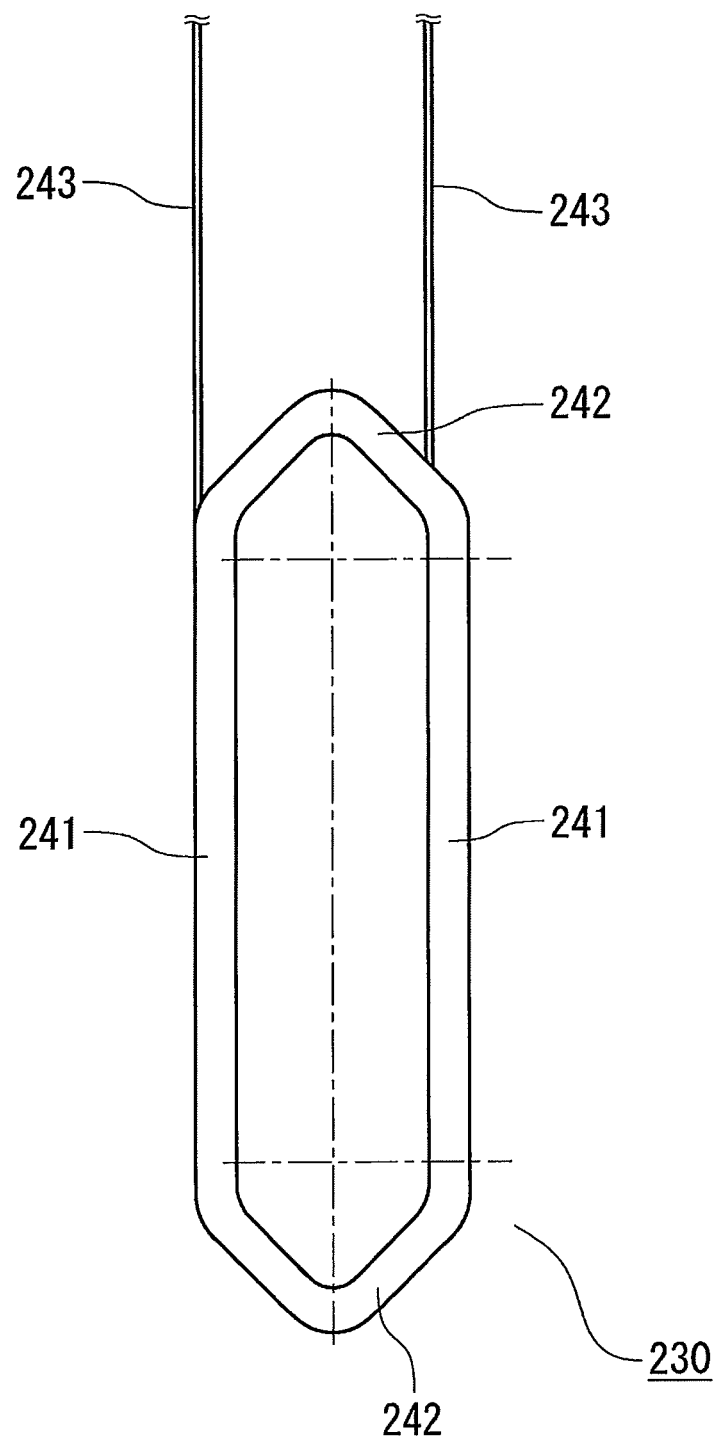
FIG. 2 is a configuration diagram of a coil according to the rotating electric machine of Embodiment 1 of the present invention.
Figure 5:
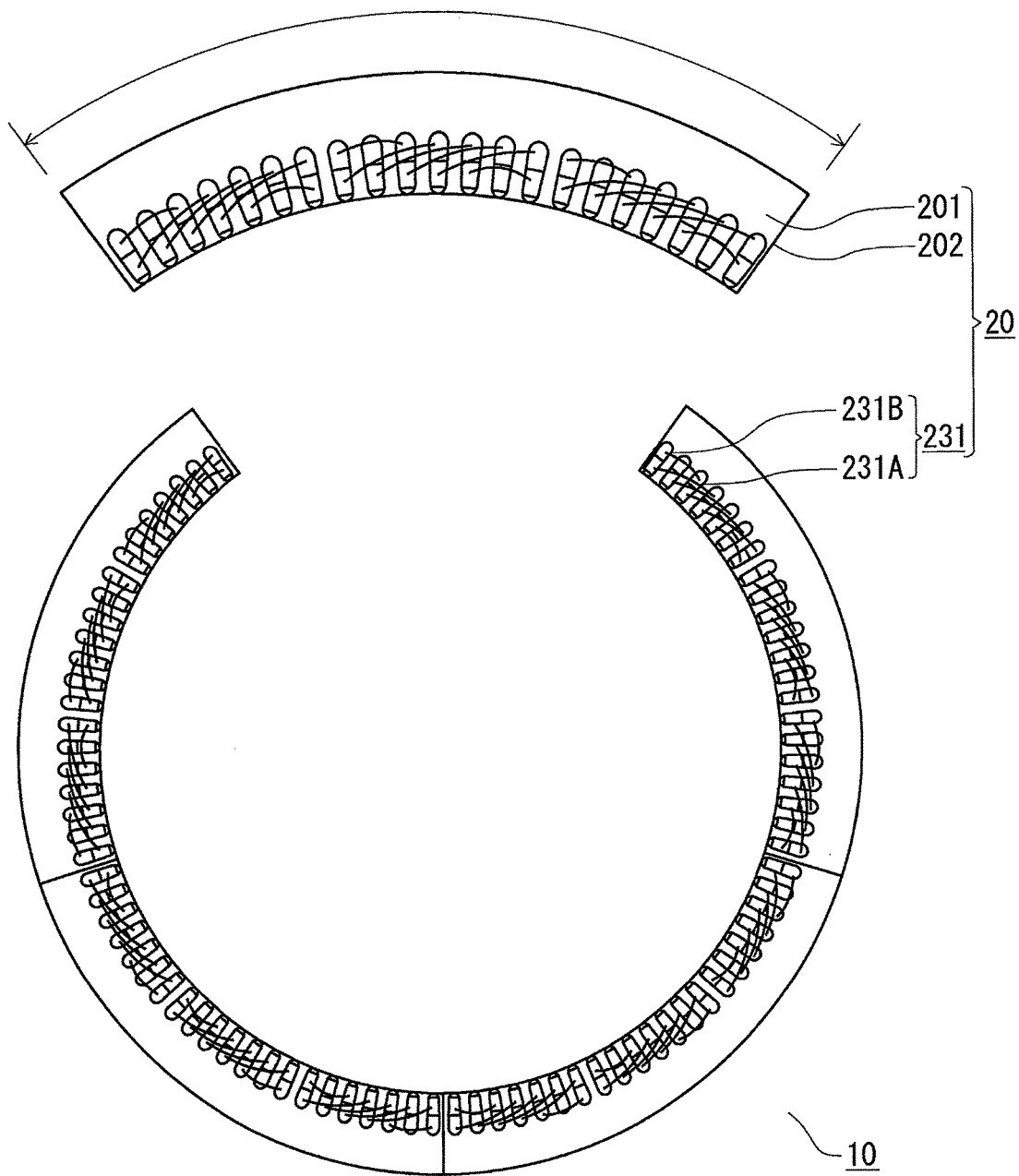
FIG. 5 is a diagram for explaining division of a stator according to the rotating electric machine of Embodiment 1 of the present invention.

FIG. 5 is a diagram for explaining division in the case where the stator 20 of the rotating electric machine 10 of FIG. 1 is divided into 5 blocks, wherein only one block is enlarged away from a center of assembling. In FIG. 5, components, such as a housing, attached to the stator 20 are omitted.

The number of slots in each block 201 of the rotating electric machine 10 of FIG. 5 is 21, which is the same as the number of slots in the block of the rotating electric machine 10 illustrated in FIG. 3. A division surface 202 corresponds to a substantially central position of a tooth adjacent to a slot in which the second armature coil described above is disposed. That is, it is desirable that the stator 20 of the rotating electric machine 10 be divided at positions where the first armature coil 231A and the second armature coil 231B do not straddle the teeth.

In Embodiment 1, the number of divisions is 5, which is the greatest common divisor of 105, which is the number of slots, and 40, which is the number of magnetic poles. This is because, in the rotating electric machine 10 according to Embodiment 1, positional relationships of slots, coils, and magnets are repeated in a cycle of the numbers obtained by dividing the number of slots and the number of magnetic poles by the greatest common divisor, i.e., in a cycle of 21 slots and 8 magnetic poles. However, the number of divisions may be smaller than the greatest common divisor.

In this case, it is desirable that the number of slots in each divided block be an integral multiple of the number (21 in this example) obtained by dividing the total number of slots by the aforementioned greatest common divisor. Also in the case with the aforementioned other combination of the number of slots and the number of magnetic poles, the number of divisions may be the greatest common divisor of the number of slots and the number of magnetic poles or may be smaller than the greatest common divisor.

By thus dividing the rotating electric machine, a distributed-winding rotating electric machine that can be conventionally configured only as an integral circle can be divided into a plurality of blocks in the circumferential direction. This makes it possible to easily assemble and disassemble even a large-size rotating electric machine because each block has a small size and light weight.

Next, a result of calculation of a winding factor in this coil arrangement will be described.

The winding factor is represented by the product of a distributed winding factor (a value indicating that a plurality of coils belonging to a certain phase are not fixed at certain positions relative to a center of a magnetic pole of a field magnet and are distributed; the maximum is 1) and a short pitch winding factor (a ratio of one coil pitch and a magnetic pole pitch). The winding factor generally has odd-numbered orders (first order, fifth order, seventh order, . . . ) excluding the number of phases, and the first order corresponds to a fundamental wave for driving the rotary machine, and the other orders correspond to harmonics that generate torque ripples.

That is, it can be said that a rotating electric machine, in which the first order component of the distributed winding factor is closer to 1 and the other harmonics components are closer to 0, more easily produces torque with smaller torque ripples.

The winding factor of the rotating electric machine according to Embodiment 1 of the present invention is 0.943 (first order), 0.155 (fifth order), and 0 (seventh order) in FIG. 3.

The winding factor of the rotating electric machine illustrated in FIG. 4 as an optimum comparative example in which all of the coils are armature coils is 0.932 (first order), 0.085 (fifth order), and 0 (seventh order). That is, the winding factor that is almost equivalent to that in FIG. 4 is also obtained in the rotating electric machine according to Embodiment 1 illustrated in FIG. 3 (in the case where some of the coils are replaced with non-armature coils). It can therefore be said that the rotating electric machine 10 has good operating characteristics.

Next, the non-armature coils 232 will be described.

The non-armature coils 232 are disposed at slot positions sandwiched between slots that constitute second armature coils.

In FIG. 3, such slot positions are the upper side of the slot number 6, the lower side of the slot number 9, the upper side of the slot number 13, and the lower side of the slot number 16. That is, in FIG. 3, the non-armature coils are coils indicated by hatching and thick arrows.

In FIG. 3, there are other slots located between slots that constitute second armature coils, but it is unnecessary to dispose coils in these slots. Such slots are the lower side of the slot number 2 and the upper side of the slot number 20.

It is desirable that the coil pitch of the non-armature coils be the same as that of first armature coils. In FIG. 3, the coil pitch between the slot number 6 and the slot number 9 and the coil pitch between the slot number 13 and the slot number 16 are 3, which is the same as that of first armature coils.

As the non-armature coils 232, one or two coils 230 are provided per block. The non-armature coils 232 may be provided in each of the blocks or may be provided in one or more blocks.

The non-armature coils 232 are not coils for driving the rotating electric machine, but coils used for improvement of ease of maintenance such as disassembly, assembly, and inspection of the rotating electric machine.

In Embodiment 1, a method for using the non-armature coils 232 as magnetizing or demagnetizing coils will be described.

It is desirable that the coils 230 used as the non-armature coils 232 have a thicker insulating layer and be wound a smaller number of turns than the coils used as the armature coils 231.

For example, an insulating tape having a thickness of approximately 25 µm to 125 µm may be wound as the insulating layer. It is desirable that the number of turns be one to several turns per coil. Furthermore, it is desirable that the coils 230 used as the non-armature coils 232 be connected in series.

Figure 7:
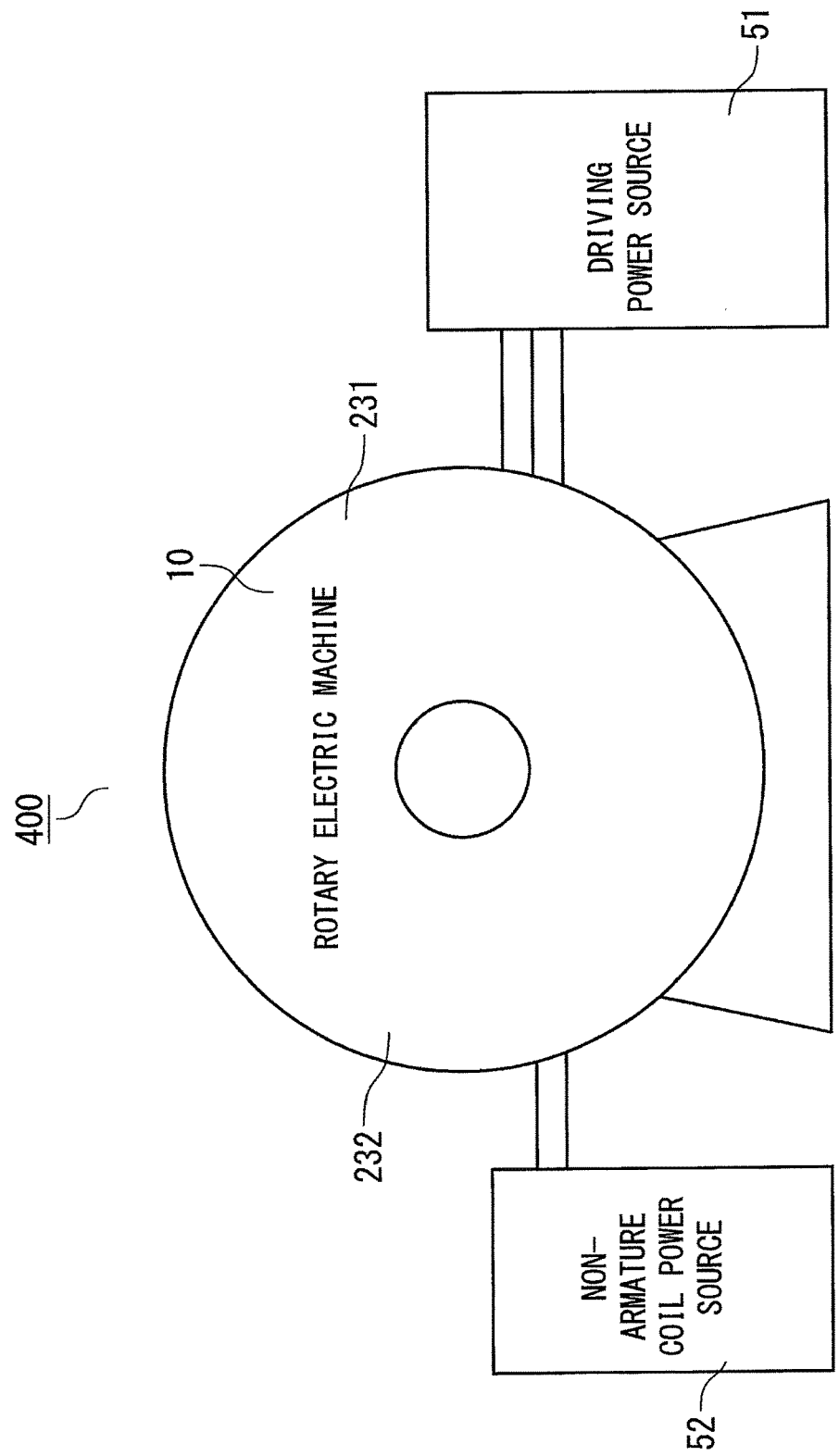
FIG. 7 is a configuration diagram according to an elevator hoisting machine of Embodiment 4 of the present invention.

Furthermore, it is desirable that the non-armature coils 232 be connected to a power source different from a power source for driving the rotating electric machine as described in Embodiment 4 (see FIG. 7 of Embodiment 4).

Next, a method for magnetizing the permanent magnets 33 by using the non-armature coils 232 will be described with reference to FIG. 6.

Figure 6:
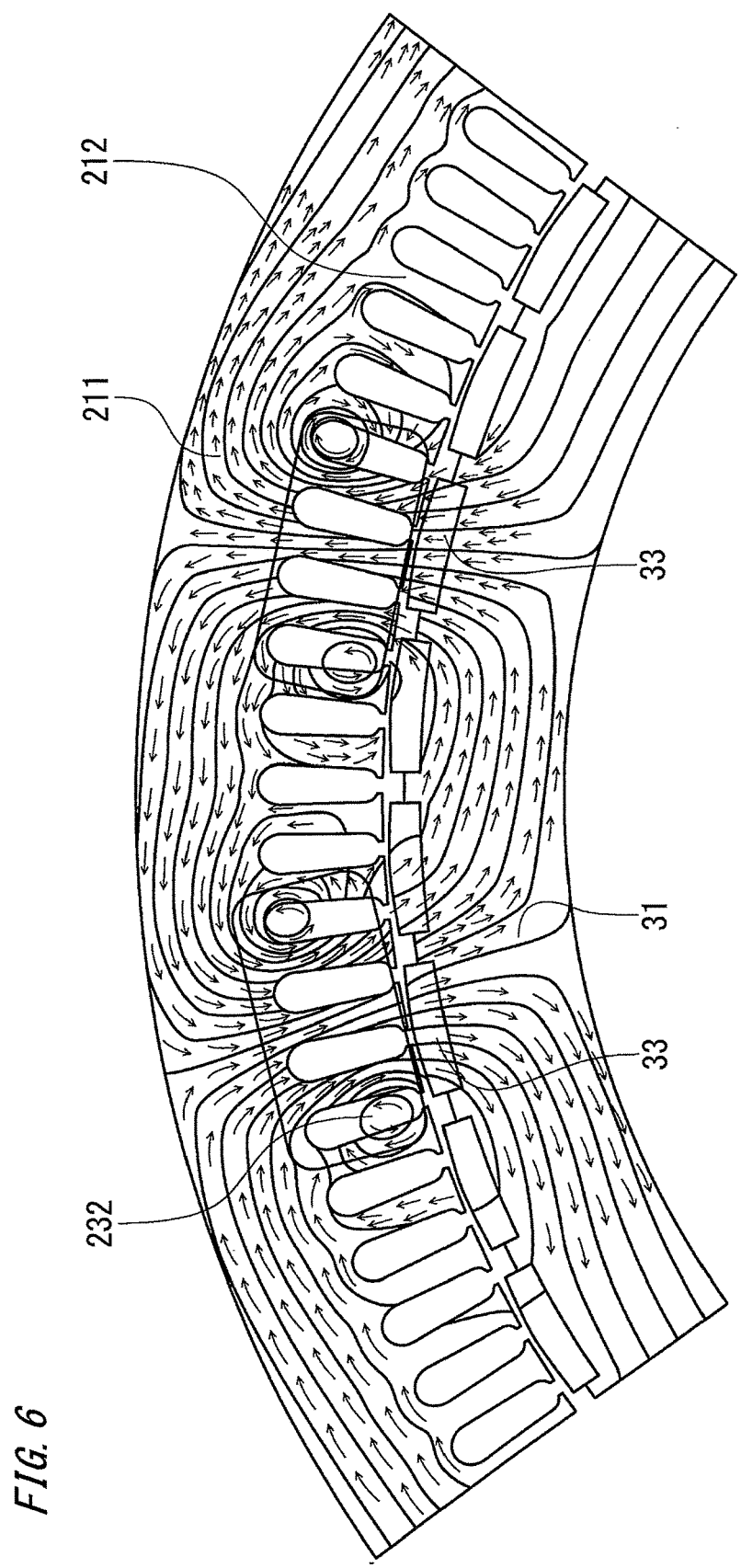
FIG. 6 is a diagram for explaining a magnetic path created by non-armature coils according to the rotating electric machine of Embodiment 1 of the present invention.

FIG. 6 is a diagram illustrating lines of magnetic flux, density of magnetic flux, and direction of magnetic flux obtained when an electric current (several tens of kA) needed for magnetizing is applied to the non-armature coils 232. In FIG. 6, no armature coil is illustrated.

In FIG. 6, in the case where the permanent magnets 33 are rare-earth magnets, a magnetic field of several tens of kAT (AT: electric current×the number of turns; called magnetomotive force or ampere-turn) is applied to the non-armature coils 232. A rare-earth magnet is generally magnetized 100% when the density of magnetic flux is 2 or more teslas. The arrows in FIG. 6 indicate only portions where the density of magnetic flux is 2 or more teslas, and the permanent magnets are magnetized in the directions indicated by the arrows. The number of turns of the non-armature coils 232 is approximately one to several turns, and a magnetizing electric current is generally approximately several to several tens of kA although the magnetizing electric current depends on a magnetic circuit.

Referring to FIG. 6, the third and sixth permanent magnets 33 from the right of FIG. 6 are magnetized to an S pole and an N pole, respectively, by the non-armature coils 232. Since the magnetic poles in a rotor are arranged alternately as S poles and N poles starting from the first magnet, the permanent magnets 33 in FIG. 6 are magnetized in a correct direction of magnetic flux.

In the case of demagnetizing the permanent magnets 33, an AC current that gradually attenuates is applied to the non-armature coils 232. For example, it is possible to employ a method of charging a capacitor with an electric charge of several thousands of µF in advance and passing an electric current through the non-armature coils 232 by connecting the non-armature coils 232 to the capacitor by using a switch. In this case, the applied electric current gradually attenuates due to the resistance and inductance of the non-armature coils 232, and therefore the permanent magnets 33 can be demagnetized.

Since a large electromagnetic force acts on the non-armature coils 232 during magnetizing, it is desirable to make the insulating layers of the coils thick as described above and fix the coils in the slots. A method for fixing the coils is, for example, a method using varnish, an adhesive, a spacer, or the like.

This magnetizing or demagnetizing operation is performed several times while the position of the rotor 30 is rotated, whereby magnetizing or demagnetizing of all of the permanent magnets 33 is completed. For example, in the case where the non-armature coils 232 are 10 coils in total (2 coils per block×5 blocks), all of the permanent magnets 33 can be magnetized or demagnetized by repeating the operation four times.

In the repeated magnetizing or demagnetizing operation, the position of the rotor 30 may be determined by using information from a rotation sensor (not illustrated) such as a resolver or an encoder attached as standard equipment to the rotating electric machine or may be mechanically determined by using a jig or the like.

As described above, the operation of magnetizing or demagnetizing the permanent magnets 33 of the rotor 30 is completed by repeating, necessary times, a step of passing a magnetizing or demagnetizing electric current through the non-armature coils 232 and a step of rotating the rotor 30 by a predetermined angle.

The predetermined angle and the necessary times are determined on the basis of the arrangement of the permanent magnets 33 and the arrangement of the non-armature coils 232. In the example of Embodiment 1, the predetermined angle is 90°, and the necessary times is four times.

The rotating electric machine 10 can have any size. For example, in the case where the rotating electric machine 10 is used in an elevator hoisting machine, the rotating electric machine 10 may have a size of several hundreds of millimeters to several meters in diameter. In the case where such a large-size rotating electric machine is installed, it can be assumed that when a need for repair, inspection, replacement, assembly, or the like of the large-size rotating electric machine arises, a sufficient space for installation cannot be ensured and the operation cannot easily be performed.

In the case where the rotating electric machine 10 according to Embodiment 1 is used in an elevator hoisting machine, it is possible to easily perform repair, inspection, replacement, assembly, or the like even in a narrow space because the stator 20 can be divided by the greatest common divisor of the number of slots and the number of magnetic poles and because the permanent magnets 33 of the rotor 30 can be magnetized or demagnetized in a state where the rotating electric machine 10 is assembled.

In the case where the housing (not illustrated) that holds the stator also has a divided structure as with the stator, ease of maintenance is further improved.

As described above, the rotating electric machine according to Embodiment 1 includes: a stator including an armature core having slots formed between magnetic pole teeth, and a plurality of coils each of which is wound so as to straddle a plurality of the magnetic pole teeth so that coil sides thereof are disposed in the slots; and a rotor including a plurality of permanent magnets that are disposed at certain intervals on an outer peripheral surface of a magnetic yoke provided on an outer peripheral side of a rotary shaft. The coils include an armature coil for driving the rotating electric machine and a non-armature coil for magnetizing or demagnetizing the permanent magnets of the rotor. It is therefore possible to provide a rotating electric machine that can be disassembled and assembled with good workability because a stator can be easily divided and that has good operating characteristics.

Embodiment 2

A rotating electric machine according to Embodiment 2 has a combination of the number of slots and the number of magnetic poles that is different from that of the rotating electric machine according to Embodiment 1 (the number of slots is 105 and the number of magnetic poles 40).

The conditions of the rotating electric machine according to Embodiment 2 will be described below.

The following conditions need be satisfied by the combination of the number of slots and the number of magnetic poles with which the rotating electric machine according to Embodiment 1 to which the present invention is applicable, i.e., a rotating electric machine including distributed winding coils can be divided in the circumferential direction and a structure in which a non-armature coil can be provided can be configured.

[Condition 1] The greatest common divisor of the number of slots and the number of magnetic poles is larger than 1 (coils are arranged periodically in a cycle of angles that can divide a mechanical angle 360°).

[Condition 2] The number of slots per pole and per phase is indivisible (even lap winding and distributed winding coils have two kinds of coil pitches).

Combinations of the number of slots and the number of magnetic poles that satisfy the conditions 1 and 2 are, for example, a combination of 180 slots and 70 poles (5 divisions) and a combination of 135 slots and 50 poles (5 divisions). Any of these combinations can be employed.

Furthermore, combinations such as a combination of 108 slots and 42 poles (3 divisions) and a combination of 81 slots and 30 poles (3 divisions) also satisfy the conditions 1 and 2.

As described above, the rotating electric machine according to Embodiment 2 has a combination of the number of slots and the number of magnetic poles that satisfies the conditions 1 and 2, and therefore it is possible to provide a rotating electric machine that can be disassembled and assembled with good workability because a stator can be easily divided and that has good operating characteristics as in Embodiment 1.

Embodiment 3

A rotating electric machine according to Embodiment 3 is a rotating electric machine in which the non-armature coils according to Embodiment 1 are used for a purpose different from magnetizing or demagnetizing of permanent magnets.

The rotating electric machine according to Embodiment 3 will be described below. In the following description, the drawings of Embodiment 1 are referred to as appropriate, and the reference signs of the respective constituent elements of Embodiment 1 are used.

The non-armature coils 232 can be used not only for magnetizing or demagnetizing, but also for improvement of ease of maintenance of the rotating electric machine 10. For example, a non-armature coil 232 that is wound several to several tens of turns is disposed at the same position in each block. The phase and the magnitude of an inductive voltage generated in this non-armature coil 232 during rotation of the rotor 30 are measured.

That is, an attachment error, eccentricity, and the like of the permanent magnets 33 can be detected by using the non-armature coil as a search coil.

As the specifications of the search coil, a thin wire may be wound a large number of turns unlike the magnetizing or demagnetizing coils described in Embodiment 1. By winding the wire a large number of turns, it is possible to improve the sensitivity of detection. In order to improve the accuracy as the search coil, it is desirable to use an adhesive or a spacer to fix the search coil to a slot as in the case of a magnetizing coil.

Embodiment 3 may be combined with Embodiment 1. For example, non-armature coils may be disposed as magnetizing or demagnetizing coils in first and second blocks, and non-armature coils may be disposed as search coils in third to fifth blocks.

Furthermore, a non-armature coil disposed as a magnetizing or demagnetizing coil may be used as a search coil during normal operation.

As described above, the rotating electric machine according to Embodiment 3 is a rotating electric machine in which the non-armature coils according to Embodiment 1 are used for a purpose different from magnetizing or demagnetizing of permanent magnets. It is therefore possible to provide a rotating electric machine that can be disassembled and assembled with good workability because a stator can be easily divided and that has good operating characteristics as in Embodiment 1.

Furthermore, in the rotating electric machine according to Embodiment 3, by using non-armature coil as a search coil, it is possible to detect an attachment error, eccentricity, and the like of the permanent magnets, thereby improving ease of maintenance.

Embodiment 4

An elevator hoisting machine according to Embodiment 4 is a hoisting machine in which any of the rotating electric machines described in Embodiments 1 to 3 is used as a motor.

The configuration and operation of the elevator hoisting machine according to Embodiment 4 will be described below with reference to FIG. 7 which is a configuration diagram of the elevator hoisting machine.

In FIG. 7, an elevator hoisting machine 400 includes the rotating electric machine 10, a driving power source (first power source) 51 that supplies power to armature coils 231 and a non-armature coil power source (second power source) 52 that supplies power to the non-armature coils 232. The rotating electric machine 10, which is a motor for a hoisting machine, is any of the rotating electric machines described in Embodiments 1 to 3.

During normal operation of the rotating electric machine 10 of the elevator hoisting machine 400, PWM-controlled three-phase AC power is, for example, supplied from the driving power source (first power source) 51 to the rotating electric machine 10.

During mounting, inspection, or disassembling of the rotating electric machine 10, an electric current necessary for magnetizing and demagnetizing of the permanent magnets 33 is supplied from the non-armature coil power source (second power source) 52 to the non-armature coils 232 of the rotating electric machine 10.

Furthermore, during normal operation of the rotating electric machine 10 of the elevator hoisting machine 400, an attachment error, eccentricity, and the like of the permanent magnets 33 can be detected by measuring the phase and the magnitude of an inductive voltage generated in the non-armature coil 232 disposed as a search coil.

Measurement of an inductive voltage generated in this non-armature coil 232 and detection of an attachment error, eccentricity, and the like of the permanent magnets 33 can also be performed by a device included in the non-armature coil power source (second power source) 52. Alternatively, an attachment error, eccentricity, and the like of the permanent magnets 33 may be detected by connecting a device for measuring the phase and the magnitude of an inductive voltage generated in the non-armature coil 232 as needed.

As described above, the elevator hoisting machine according to Embodiment 4 is a hoisting machine in which any of the rotating electric machines described in Embodiments 1 to 3 is used. It is therefore possible to magnetize or demagnetize the permanent magnets of the rotating electric machine by using the non-armature coil, thereby improving work efficiency during installation and inspection.

Furthermore, ease of maintenance of the rotating electric machine can be improved by using the non-armature coil as a search coil.

It is noted that, within the scope of the present invention, the above embodiments may be freely combined with each other, or each of the above embodiments may be modified or simplified as appropriate.

INDUSTRIAL APPLICABILITY

The present invention includes an armature coil for driving a rotating electric machine and a non-armature coil for magnetizing or demagnetizing permanent magnets of a rotor and is widely applicable to a rotating electric machine that is required to have improved work efficiency during installation and inspection.

The invention claimed is:

1. A rotating electric machine comprising:
a stator including an armature core including a back yoke having an annular shape, a plurality of magnetic pole teeth extending radially inward from the back yoke, and slots surrounded by the back yoke and the magnetic pole teeth, and
a plurality of coils each of which is wound so as to straddle a plurality of the magnetic pole teeth and is disposed in the slots; and
a rotor including a rotary shaft, a magnetic yoke provided on an outer peripheral side of the rotary shaft, and a plurality of permanent magnets disposed at predetermined intervals on an outer peripheral surface of the magnetic yoke, wherein
the coils include armature coils for driving the rotating electric machine and a non-armature coil for magnetizing or demagnetizing the permanent magnets of the rotor.

2. The rotating electric machine according to claim 1, wherein
the armature coils include: a first armature coil that is disposed on an opening side and a core back side of the slots so that the number of magnetic pole teeth which the first armature coil straddles is a minimum natural number larger than (the number of slots/the number of magnetic poles); and a second armature coil that is disposed on opening sides of the slots or core back sides of the slots so that the number of magnetic pole teeth which the second armature coil straddles is a largest natural number smaller than (the number of slots/the number of magnetic poles); and
the stator is divided into a plurality of blocks, and arrangement of the first armature coil and the second armature coil is complete within each of the blocks.

3. The rotating electric machine according to claim 2, wherein
the non-armature coil is disposed in a slot sandwiched between the slots in which the second armature coil is disposed.

4. The rotating electric machine according to claim 1, wherein
the number of magnetic pole teeth which the non-armature coil straddles is a minimum natural number larger than (the number of slots/the number of magnetic poles).

5. The rotating electric machine according to claim 1, wherein
a combination of the number of slots and the number of magnetic poles is determined so that a greatest common divisor of the number of slots and the number of magnetic poles is larger than 1 and the number of slots per pole and per phase is indivisible.

6. The rotating electric machine according to claim 1, wherein
the non-armature coil is used to detect an attachment error and eccentricity of the permanent magnets.

7. An elevator hoisting machine comprising:
a rotating electric machine that is used as a motor for the hoisting machine;
a first power source for armature coils; and
a second power source for a non-armature coil, wherein the rotating electric machine comprises:
a stator including an armature core including a back yoke having an annular shape, a plurality of magnetic pole teeth extending radially inward from the back yoke, and slots surrounded by the back yoke and the magnetic pole teeth, and
a plurality of coils each of which is wound so as to straddle a plurality of the magnetic pole teeth and is disposed in the slots; and
a rotor including a rotary shaft, a magnetic yoke provided on an outer peripheral side of the rotary shaft, and a plurality of permanent magnets disposed at predetermined intervals on an outer peripheral surface of the magnetic yoke, wherein
the coils include armature coils for driving the rotating electric machine and a non-armature coil for magnetizing or demagnetizing the permanent magnets of the rotor.

8. A method for magnetizing or demagnetizing the permanent magnets of a rotating electric machine, comprising the steps of:
passing a magnetizing or demagnetizing electric current through a non-armature coil; and
rotating a rotor by a predetermined angle,
the step of passing the magnetizing or demagnetizing electric current and the step of rotating the rotor being repeated, wherein
the rotating electric machine comprises:
a stator including an armature core including a back yoke having an annular shape, a plurality of magnetic pole teeth extending radially inward from the back yoke, and slots surrounded by the back yoke and the magnetic pole teeth, and
a plurality of coils each of which is wound so as to straddle a plurality of the magnetic pole teeth and is disposed in the slots; and
a rotor including a rotary shaft, a magnetic yoke provided on an outer peripheral side of the rotary shaft, and a plurality of permanent magnets disposed at predetermined intervals on an outer peripheral surface of the magnetic yoke, wherein
the coils include armature coils for driving the rotating electric machine and a non-armature coil for magnetizing or demagnetizing the permanent magnets of the rotor.

9. The rotating electric machine according to claim 2, wherein
the number of magnetic pole teeth which the non-armature coil straddles is a minimum natural number larger than (the number of slots/the number of magnetic poles).

10. The rotating electric machine according to claim 2, wherein
a combination of the number of slots and the number of magnetic poles is determined so that a greatest common divisor of the number of slots and the number of magnetic poles is larger than 1 and the number of slots per pole and per phase is indivisible.

11. The rotating electric machine according to claim 2, wherein
the non-armature coil is used to detect an attachment error and eccentricity of the permanent magnets.

12. The rotating electric machine according to claim 3, wherein
the number of magnetic pole teeth which the non-armature coil straddles is a minimum natural number larger than (the number of slots/the number of magnetic poles).

13. The rotating electric machine according to claim 3, wherein
a combination of the number of slots and the number of magnetic poles is determined so that a greatest common divisor of the number of slots and the number of magnetic poles is larger than 1 and the number of slots per pole and per phase is indivisible.

14. The rotating electric machine according to claim 3, wherein
the non-armature coil is used to detect an attachment error and eccentricity of the permanent magnets.

15. The elevator hoisting machine according to claim 7, wherein
the armature coils include: a first armature coil that is disposed on an opening side and a core back side of the slots so that the number of magnetic pole teeth which the first armature coil straddles is a minimum natural number larger than (the number of slots/the number of magnetic poles); and a second armature coil that is disposed on opening sides of the slots or core back sides of the slots so that the number of magnetic pole teeth which the second armature coil straddles is a largest natural number smaller than (the number of slots/the number of magnetic poles); and
the stator is divided into a plurality of blocks, and arrangement of the first armature coil and the second armature coil is complete within each of the blocks.

16. The elevator hoisting machine according to claim 7, wherein
the non-armature coil is disposed in a slot sandwiched between the slots in which the second armature coil is disposed.

17. The elevator hoisting machine according to claim 7, wherein
the non-armature coil is used to detect an attachment error and eccentricity of the permanent magnets.

18. The method for magnetizing or demagnetizing the permanent magnets of the rotating electric machine according to claim 8, wherein
the armature coils include: a first armature coil that is disposed on an opening side and a core back side of the slots so that the number of magnetic pole teeth which the first armature coil straddles is a minimum natural number larger than (the number of slots/the number of magnetic poles); and a second armature coil that is disposed on opening sides of the slots or core back sides of the slots so that the number of magnetic pole teeth which the second armature coil straddles is a largest natural number smaller than (the number of slots/the number of magnetic poles); and
the stator is divided into a plurality of blocks, and arrangement of the first armature coil and the second armature coil is complete within each of the blocks.

19. The method for magnetizing or demagnetizing the permanent magnets of the rotating electric machine according to claim 8, wherein
the non-armature coil is disposed in a slot sandwiched between the slots in which the second armature coil is disposed.

20. The method for magnetizing or demagnetizing the permanent magnets of the rotating electric machine according to claim 8, wherein
the non-armature coil is used to detect an attachment error and eccentricity of the permanent magnets.

* * * * *